(12) United States Patent
Cheriton

(10) Patent No.: US 11,294,905 B2
(45) Date of Patent: Apr. 5, 2022

(54) SPARSE DATA INDEX TABLE

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

( * ) Notice: Subject to any disclaimer, the term of this patent is extended or adjusted under 35 U.S.C. 154(b) by 0 days.

(21) Appl. No.: 16/724,927

(22) Filed: Dec. 23, 2019

(65) Prior Publication Data

US 2020/0218725 A1    Jul. 9, 2020

Related U.S. Application Data

(60) Provisional application No. 62/789,410, filed on Jan. 7, 2019, provisional application No. 62/799,609, filed on Jan. 31, 2019.

(51) Int. Cl.
*G06F 16/2458* (2019.01)
*G06F 16/22* (2019.01)
*G06F 16/2455* (2019.01)

(52) U.S. Cl.
CPC .... *G06F 16/24558* (2019.01); *G06F 16/2228* (2019.01); *G06F 16/2282* (2019.01); *G06F 16/2458* (2019.01)

(58) Field of Classification Search
None
See application file for complete search history.

(56) References Cited

U.S. PATENT DOCUMENTS

| | | | | |
|---|---|---|---|---|
| 5,873,079 A | * | 2/1999 | Davis, III | G06F 16/245 |
| 8,260,769 B1 | * | 9/2012 | Fuller | G06F 16/2228 |
| | | | | 707/721 |
| 2002/0099691 A1 | * | 7/2002 | Lore | G06F 16/2237 |
| 2005/0154710 A1 | * | 7/2005 | Ruhlow | G06F 16/24561 |
| 2006/0034461 A1 | * | 2/2006 | Park | H04W 12/0401 |
| | | | | 380/277 |
| 2006/0085689 A1 | * | 4/2006 | Bjorsne | G06F 11/079 |
| | | | | 714/39 |
| 2007/0250469 A1 | * | 10/2007 | Unruh | G06F 16/328 |
| 2012/0124056 A1 | * | 5/2012 | Egan | G06F 16/901 |
| | | | | 707/744 |
| 2012/0137060 A1 | * | 5/2012 | Akerib | G06F 3/0604 |
| | | | | 711/105 |

OTHER PUBLICATIONS

Oracle, Oracle Database Data Warehousing Guide 10g Release 2 (10.2), Dec. 2005 (Year: 2005).*

* cited by examiner

*Primary Examiner* — Yu Zhao
(74) *Attorney, Agent, or Firm* — Van Pelt, Yi & James LLP

(57) ABSTRACT

A set of queries on a collection of data records is received. A set of subconditions required to support the set of queries is determined. An index table is maintained, wherein an entry in the index table indicates a subcondition status associated with a data record in the collection of data records. A specific query is received indicating a specified set of subcondition statuses. The specified set of subcondition statuses is matched against the index table. A result set is returned corresponding to matched rows in the index table, wherein the matched rows match the specified set of subcondition statuses.

12 Claims, 11 Drawing Sheets

Query Using Index Table 64-bit known/value block representation

SPARSE DATA INDEX TABLE

CROSS REFERENCE TO OTHER APPLICATIONS

This application claims priority to U.S. Provisional Patent Application No. 62/789,410 entitled SPARSE DATA INDEX TABLE filed Jan. 7, 2019 and U.S. Provisional Patent Application No. 62/799,609 entitled INDEX TABLE AS QUERY SUPPORT ON SPARSE DATA filed Jan. 31, 2019 both of which are incorporated herein by reference for all purposes.

BACKGROUND OF THE INVENTION

Databases organize data for a query. Indexing is a technique for improving the performance of a database query. In some situations, traditional indexing may be inefficient, incurring space overhead without significantly reducing query cost. There is thus a need to improve indexing for databases for such situations.

BRIEF DESCRIPTION OF THE DRAWINGS

Various embodiments of the invention are disclosed in the following detailed description and the accompanying drawings.

DETAILED DESCRIPTION

Figure 1:
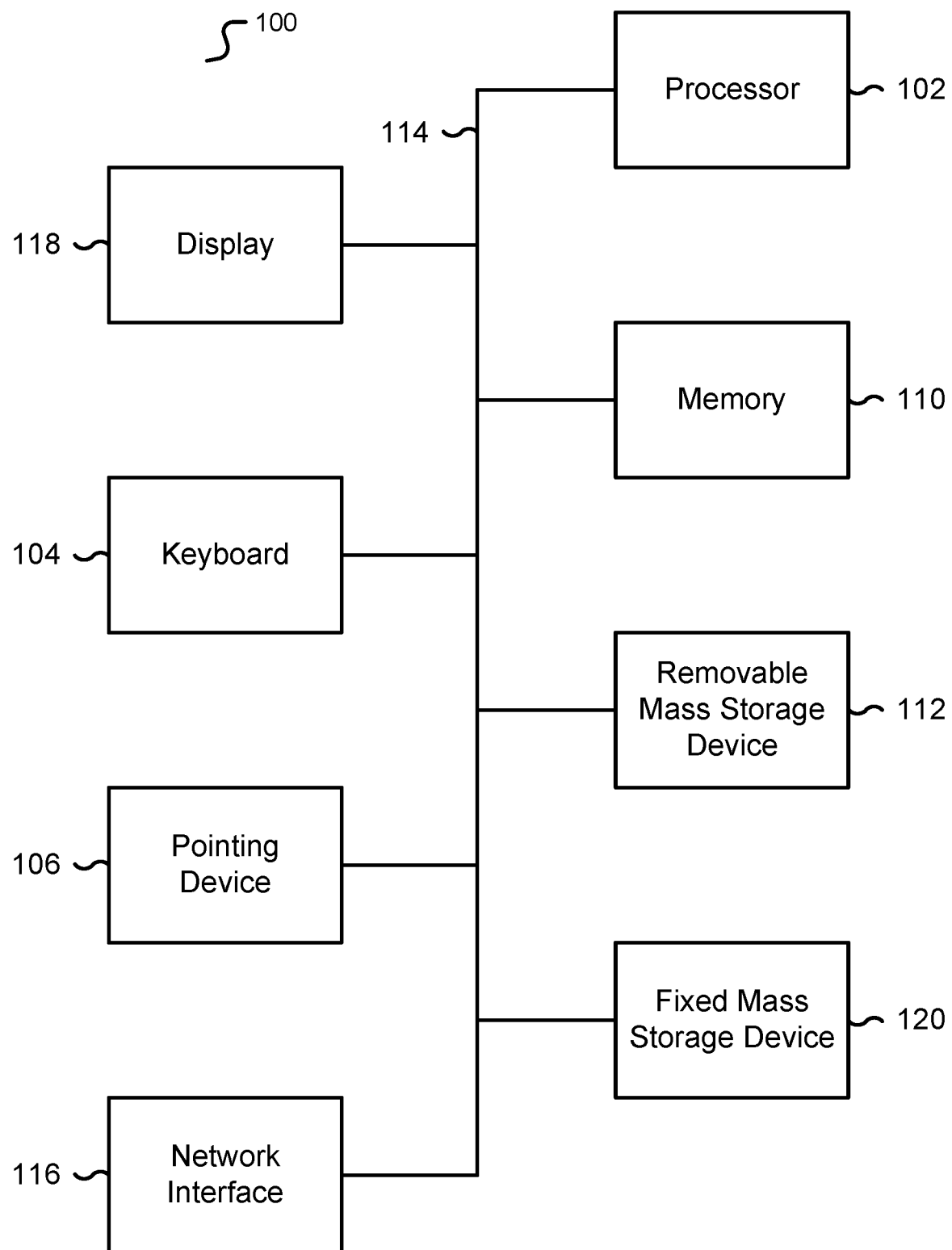
FIG. 1 is a functional diagram illustrating a programmed computer/server system for a sparse data index table in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Indexing a sparse data set efficiently is disclosed. As referred to herein, tables may be sparse in the sense that there are a large number of entries that contain what database terminology refers to as the NULL value. This NULL value typically corresponds to "not known" or "don't care." One embodiment is an entry corresponding to an "unknown" value corresponding to an entry value that is not known. Another embodiment is an entry corresponding to a "don't care" value, also referred to as an extraneous value, corresponds to an entry not needed for a particular analysis that is used. For example, consider a table of criminal offenders living in a given area. There may be a large number of fields that can describe an offender such as a criminal offense and moniker, yet many fields may not necessarily be known such as legal name, criminal associates, and motive.

For applications with a sparse data table, using an index table with at least one bitmap index extended with a capability to indicate a "don't care" value is disclosed. The index table for a given row includes a subcondition value corresponding to an index subcondition for the data table. A match mechanism is disclosed wherein an index table and an index row mask are input to return a list of rows that match the mask using ternary and/or quaternary matching.

FIG. 1 is a functional diagram illustrating a programmed computer/server system for a sparse data index table in accordance with some embodiments. As shown, FIG. 1 provides a functional diagram of a general purpose computer system programmed to associate with a sparse data index table in accordance with some embodiments. As will be apparent, other computer system architectures and configurations may be used for a sparse data index table.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as is well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storages (112), (120) generally store additional programming instructions, data, and the like that typically are not in active use by the processor (102). It will be appreciated that the information retained within mass storages (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example, a script that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Indexing Data Tables.

Indexing is used in improving the performance of database queries. A typical database index is a data structure that is constructed to quickly locate data without having to search every row in a database every time a database table is accessed.

As discussed herein, a subcondition refers to the interpretation of the value of an index as it is more general than just indexing on a specific value in a column. For example, a true value in an index "hot temperature for sensor 21?" may just indicate that the corresponding entry in the corresponding row of the table is over a specified threshold "temperature of sensor 21 is greater than 212 F." A subcondition such as temperature being over a given threshold may be sufficient for the application, and may be changing far less frequently than the actual value. If a query condition specifies a subcondition that is handled by a traditional index, the query processor may access the index and just iterate over those records indicated to be relevant by the index, matching the rest of the query condition, rather than doing a full table scan over an entire data table associated with the index.

A full table scan of an entire data table incurs a cost that is O(N), where N is the number of rows in the data table. If the index contains K entries, where K is much smaller than N, the scan of the K entries is much faster than the scan of all N entries because there are fewer records to examine and because the query condition is reduced by the subcondition being handled by the index. Moreover, if each record is B bytes in length on average, a full scan typically incurs N*B bytes of I/O or memory access, if the data is in memory, whereas the index reduces this I/O or memory requirement significantly.

An index may also be useful to police constraints. For example, a column C of a given data table is required to have unique values. If this data table is indexed by column C, when a record is modified or a new record is added, the index may be used to efficiently check whether the value in column C already occurs in a record in the data table.

When the cardinality of a field/column being indexed is low, a common traditional technique in database management is to use a bitmap index. For example, with two possible subcondition values of true and false in the bitmap index, a logical bit per row indicates whether the corresponding entry matches the subcondition associated with this bitmap. A database subcondition normally occurs as a component of a query, for example in the where clause in SQL. If a subcondition in a query corresponds to one represented by a bitmap index, the bitmap index can be used to make processing the query more efficient.

For example, if a field is a boolean value indicating whether an employee is a salaried employee or not, the index for non-salaried employees has a true entry for each employee that is not a salaried employee. Then, when the query condition specifies non-salaried employees, the query can just determine the rows to consider by finding the true entries in this bitmap index, evaluating the rest of the query condition on each of these rows. As another example, the column subcondition may be a threshold that indicates whether the associated data value is over the threshold or not, for example if an employee was paid over $50,000 last calendar year.

If the column value/subcondition has a greater cardinality than Boolean values, multiple bitmaps may be used together to represent the values. For instance, one index may indicate if the temperature is warm or cool, and another index may indicate if the temperature is very hot or very cold. Techniques such as binning and thresholds are traditional techniques in using bitmap indexes.

Traditional Index.

Figure 2:
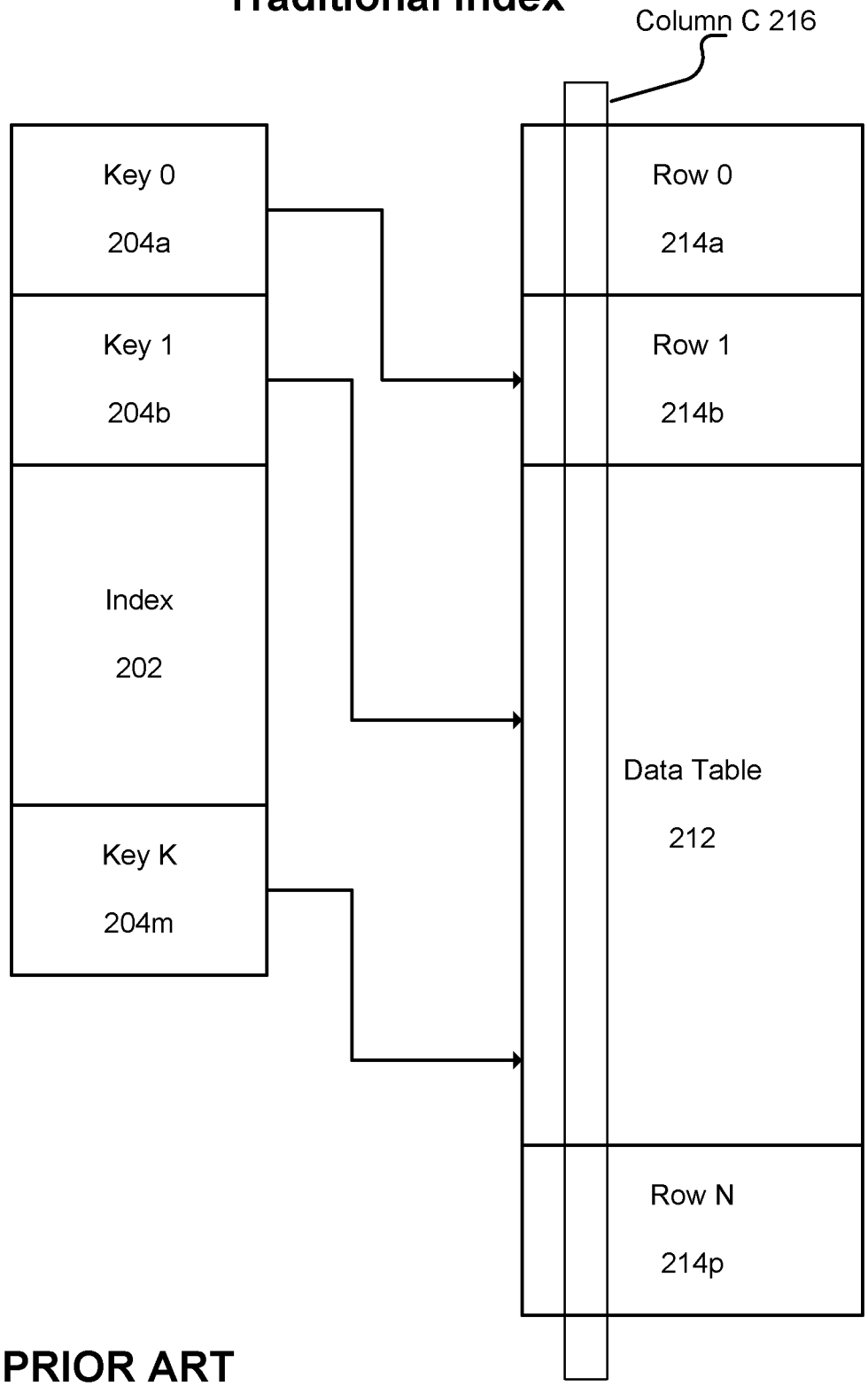
FIG. 2 is an illustration of an embodiment of a traditional bitmap index that logically references certain rows in a base data table.

FIG. 2 is an illustration of an embodiment of a traditional bitmap index that logically references certain rows in a base data table. As shown in FIG. 2, an index (202) is associated with data table (212). Index rows (204a, 204b, . . . 204m) correspond to a particular subcondition in data table rows (214a, 214b, . . . , 214p). Traditionally, the i-th entry of the bitmap corresponds to the i-th row as shown in FIG. 2, so there is no need to explicitly store a key.

One optimization is to use a sparse representation of the bitmap index (202), in which only true entries are stored, so any entry in the index (202) that is not stored defaults to false. Then, if there are relatively few true entries, the bitmap (202) requires substantially less memory and may be faster to traverse.

In this sparse case, using a traditional index (202) may be problematic. If the index for a column C (216) does not include the rows that have a "don't care" value in the C-th column, a query that matches the "don't care" values in the C-th column cannot use the index (202) because the index (202) would not include rows that are potential matches. Thus, the query would need to do a full scan of data table (212). On the other hand, if an index (202) on column C (216) includes the rows that contain a "don't care" value in the C-th column, the index (202) would contain most of the rows in the table (212), and so incurs significant space overhead and yet does not reduce the query cost significantly over doing a full scan of data table (212), because of the large number of rows it includes so the index (202) again does not provide significant benefit.

In a common case query of a sparse table, the query condition may contain multiple subconditions that are each allowed to match the NULL value. For example, continuing from above, a query of an offender database should find a collection of good matches from a given/partial description, not requiring every aspect of the description be known to the database. In this case, using an index (202) can be more expensive than just a full scan of data table (212) because the query using an index (202) would typically scan most of the rows in the table, and possibly in a different order than provided by the clustered index, leading to suboptimal iteration over the indexed rows. That is, the scan may not take place in the order specified by the clustered index.

As a related scenario, in some applications, the expected queries rely on one or more subconditions that are infrequently true. For instance, if the data of interest is the state of a large number of ovens in a factory, and the primary query on ovens is to check for ovens that are over some threshold temperature, it is more efficient to have the index (202) use a threshold subcondition rather than one that indexes the actual temperature. Using the threshold subcondition, there are typically zero or only a few ovens that are over the threshold temperature, wherein the system does not "care" about the others. Thus, the index itself is effectively very sparse. In this vein, an index can end up as sparse either because the data table (212) itself is sparse or because the index subcondition is mostly false.

Alternatively, in this example, note that the data table is sparse for oven temperature because, if the temperature is not over the threshold, the system does not "care" what the temperature is, so it is not useful to store. Not storing a value when the system does not "care" about the value not only saves on space but also saves on updating the table repeatedly as the value changes.

For example, if the temperature reading is updated every 1 second and there are 1000 ovens, there is likely 1000 updates to the table per second. On the other hand, if only the temperatures over the threshold are stored, there is frequently 0 or a small number of updates per second because there are either no ovens or only a small number of ovens that are over the threshold temperature, and an oven does not typically oscillate between being over threshold and under threshold.

Another domain in which sparsity arises is with a graph-represented dataset. Traditionally, a graph represented as a table may be sparse. Each node of a graph traditionally has a small subset of the total set of edges. A common query includes the subcondition of "nodes that directly connect to given node Ni." In a typical directed graph, a node only explicitly indicates its outbound edges, not inbound edges. Because most nodes connect to a small subset of the total set of nodes, an index supporting this query is sparse. Moreover, there needs to be such an index for each node in the graph, incurring a significant space cost. With any index, determining the set of nodes satisfying this subcondition requires a full table scan of the table of nodes.

What is needed is a means of efficiently querying a large sparse database/dataset without incurring significant time and space overhead.

Indexing Mechanism.

Figure 3:
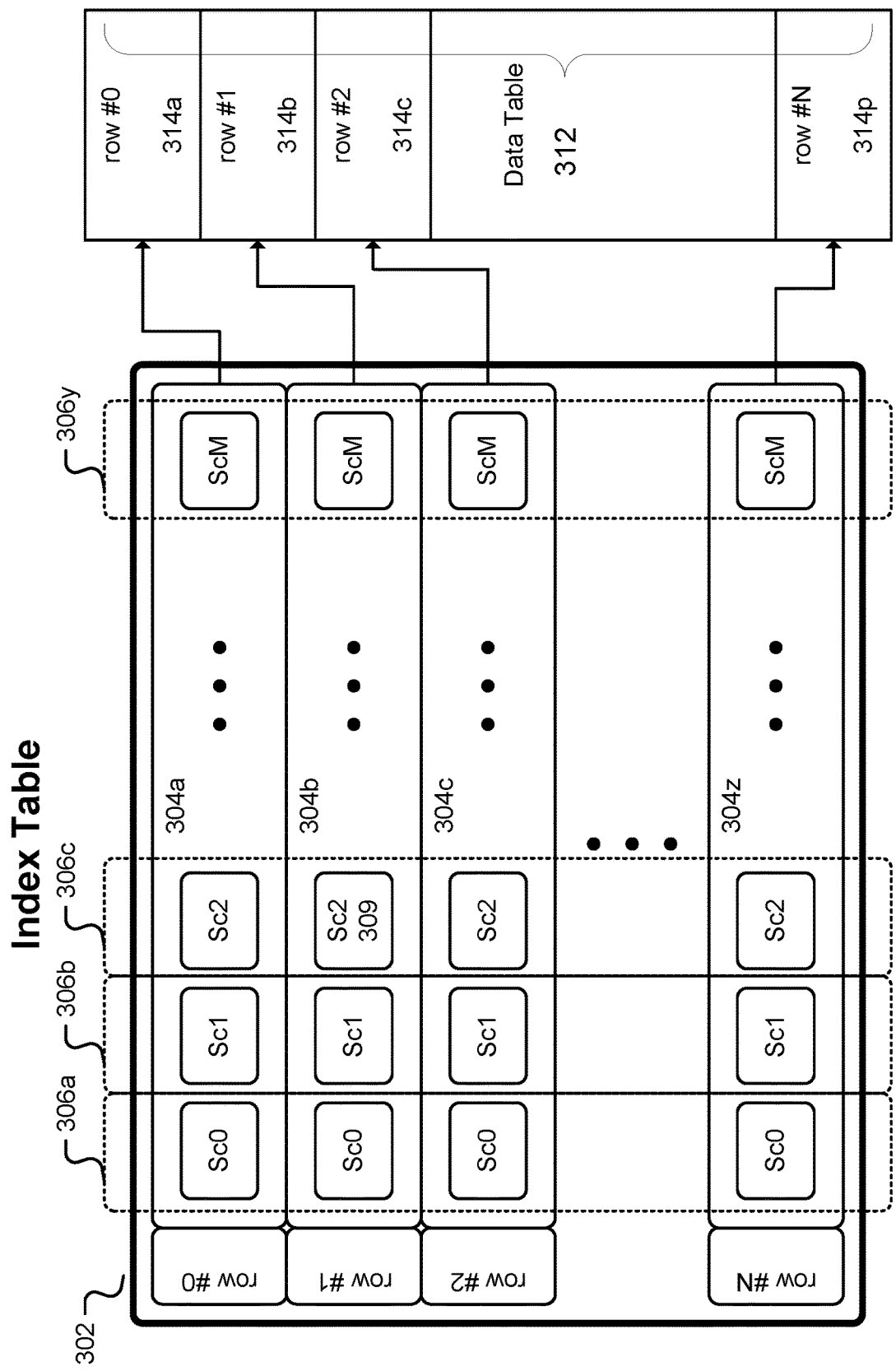
FIG. 3 is an illustration of an index table.

FIG. 3 is an illustration of an index table. As shown in FIG. 3, the index table (302) stores M+1 indexes, one per column (306a, 306b, . . . , 306y) across the N rows (304a, 304b, . . . , 304z) of the index table (302) corresponding to a data table (312). This index table (302) is optimized for efficient full scan while performing multiple index matches as part of this scan. In particular, each column (306) in an index table (302) represents an index. A row (304a) contains the entry values for each of the indexes for the corresponding row in the data table (314a).

As referred to herein, an index table row, for example row #2 (304c), contains a subcondition value for each index subcondition for a data table row corresponding to this index table row, in this example row #2 (314c). Note that a subcondition value may be NULL.

For example, the subcondition value Sc2 (309) in row #1 (304b) is the value for an index corresponding to Sc2 for row #1 (314b) of the corresponding data table (312). Again, the value is allowed to be NULL, representing "don't care" or "not known."

Figure 4A:
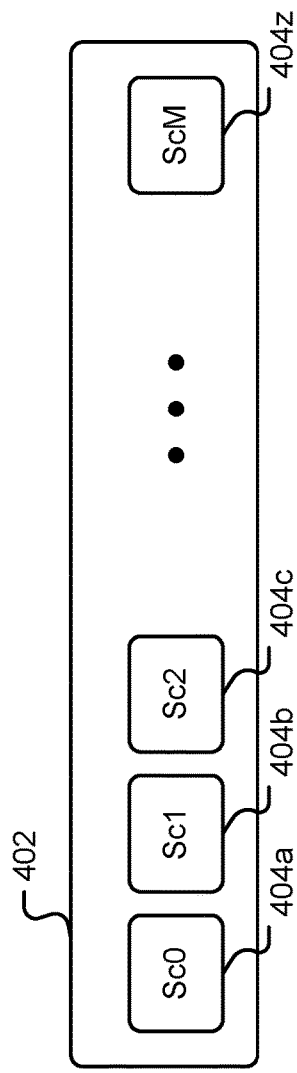
FIG. 4A is an illustration of an index row mask.

FIG. 4A is an illustration of an index row mask. In one embodiment, a match mechanism takes as input the index table (302) of FIG. 3 and index row mask (402), where this mask specifies a value per index/subcondition (404a, 404b, 404c, . . . 404z), and returns the list of rows that match this mask. The mask may specify a NULL value for an index, indicating "not known."

Binary, Ternary, and Quaternary Representation.

In one embodiment, a value has three or more states, including the values of "true", "false" and "don't care". In one embodiment, ternary subcondition values are used so that a subcondition is represented as a "known" bit indicating known or unknown by the bit value being true or false respectively, and a second "value" bit that indicates true or false, which is only interpreted as such if the "known" bit is set to true. A quaternary nomenclature using two bits to represent a ternary value is referred to herein as [a, b] wherein a is whether a state is known (0=unknown, 1=known) and b is a value associated with the state (0=false, 1=true). With this convention, an interpretation of [0,1] that is allowable is that an associated subcondition is "not known to be true": Compare [0,0], which may correspond to the state of unknown, with [0,1], which may be interpreted as "not known to be true". Note that a [0,1] subcondition in an entry in an index table (302) may match to an input that is false or unknown, and is unlike [0,0], which does not match any input to true. Thus [0,1] may not necessarily be treated the same as [0,0] and/or may not be allowed in an internal and/or consistent representation. Alternatively, this 4$^{th}$ value can be treated as "unknown" and only matches if the corresponding index table entry also indicates the same "unknown" value, namely [0,1].

In one embodiment, a value has two states that allows for different matching behavior for different columns of the table. For a value with binary states, in many applications an object has a symptom or else the clients "don't care", for example an object representing isOverheating. Recognizing this, an alternative approach is to have two values per entry rather than three, corresponding to "true" and "don't care". A corresponding match operator output table is:

| | Table Entry | |
|---|---|---|
| Input | "don't care" | "true" |
| "don't care" | match | no-match |
| "true" | match | match |

This reduces the number of bits required per entry to one, rather than two—the minimum for a ternary representation—so is half as expensive in memory.

There are cases in which there is a need to match on both an entity having a symptom S1 and as well as in a separate rule/root cause, not having a symptom, such as S1 is false. For this case, an extra symptom S2 may be explicitly introduced that corresponds to the negation of S2, for example a symptom S1 may be lossOfPower and S2 may be hasPower. Then, a row that requires symptom S1 may have the corresponding table entry set to "true" and the entry for S2 set to "don't care". Conversely, a row that requires S2 may have that entry set to "true" and the S1 entry set to "don't care". Thus, if for example ten percent of the symptoms require negation, it would still be less expensive in space than the 2-bit approach, that is, an extra 10 percent space but not 100 percent more.

In one embodiment, a combination of S1 and S2 both being true may correspond to "unknown". That is, if the input sets both S1 and S2 then the symptom is treated as "unknown". Representing a state as "unknown" may be more useful in applications than "not known to be true" interpretation of a fourth value. There is no change or extension to the above matching for this "unknown" support to work. The S1 and S2 entries in a row both specify true, and the input specifies these entries as true as well, so it matches on "unknown".

There are also symptoms that are effectively a discrete enumeration of values, such as very cold, cold, cool, normal, warm, hot, very hot. These seven values may be represented in three bits in a normal binary representation. However, with the above "true"/"don't care" binary approach, one would need six symptoms for the positive and the negation as separate symptoms for each bit. Alternately, seven separate symptoms for a "one-hot" representation of these seven values may be used.

In one embodiment, a specific set of columns used by symptoms representing such an enumeration is used. In this case, specific columns are designated as being matched as "true"/"false", as opposed to "true"/"don't care" to represent the enumeration in three columns, rather than six or seven. There is still a need for a "don't care" value so that a row that does not care about the value of this enumeration symptom may indicate this. Thus, the designation of a column value width is allowed and one value reserved to indicate "don't care", for example all zeros. In this case, a logical column width of three bits may be designated so [0,0,0] may correspond to "don't care". Therefore, this enumeration may be represented in three bits, yet still allow "don't care" to be specified in rows that do not care about the enumeration symptom.

Therefore, this additional extension allows the table designation of logical column width and treating the all zeros case as "don't care". Then, the columns corresponding to isOverheating or S1,S2 may be tagged as one-bit width whereas the columns corresponding to the above enum. would be tagged as one logical column of three bits.

In one embodiment, an efficient representation of column width is having a bit per column that is set if the next column is a continuation of this column. Equivalently, the bit indicating it is a continuation of the previous column. Thus, the columns corresponding to the enumeration may be tagged as [1,1,0] to indicate three-bit columns that form one logical column/entry.

Generally, the table may designate column widths as well as the matching behavior for a logical column. As an example of this more general case, the table may designate a logical column as being five bits wide and the matching behavior being a test for "greater than". That is, the input may match on this entry if its value in these five bits was a binary value that was greater than the value in the table entry, except treating the table entry as "don't care" if it is zero and as "unknown" if it is all ones. As another example of specified matching behavior, it may designate the matching behavior as the logical OR of the input across these columns. By having one bit in the logical column that indicates whether the symptom is relevant to this row and excluding that from the OR, the all zeros value in a table entry may be treated as "don't care".

In one embodiment, hardware instructions such as the "ANDN" or logical AND NOT instruction in the Intel and AMD instruction set, may be used with a binary representation. Hardware instructions are generally faster to execute and more efficient to program than their software counterparts. The ANDN instruction performs a bitwise logical AND with an inverted first operand and a second operand, for example with result mismatch for two operated inBlock and tableBlock:

mismatch=~inBlock & tableBlock with corresponding output table:

|  | tableBlock | |
| --- | --- | --- |
| inBlock | "don't care" = 0 | "true" = 1 |
| "don't care" = 0 | mismatch = 0 | mismatch = 1 |
| "true" = 1 | mismatch = 0 | mismatch = 0 | and thus if mismatch is the complement of match,

|  | tableBlock | |
| --- | --- | --- |
| inBlock | "don't care" = 0 | "true" = 1 |
| "don't care" = 0 | match | mismatch |
| "true" = 1 | match | match |

Unlike a traditional index shown in FIG. 2, the collection of indices disclosed are pivoted into an index table (302) as shown in FIG. 3, rather than each being treated as a separate/associative array of values.

As shown in FIG. 3, in a typical case the index table (302) has N rows (304) if there are N rows in the associated data table (312). Otherwise, if a row in the data table (314a . . . 314p) has no corresponding row in the index table (302), it can only be found in a query by doing a full scan of the data table (312).

Figure 4B:
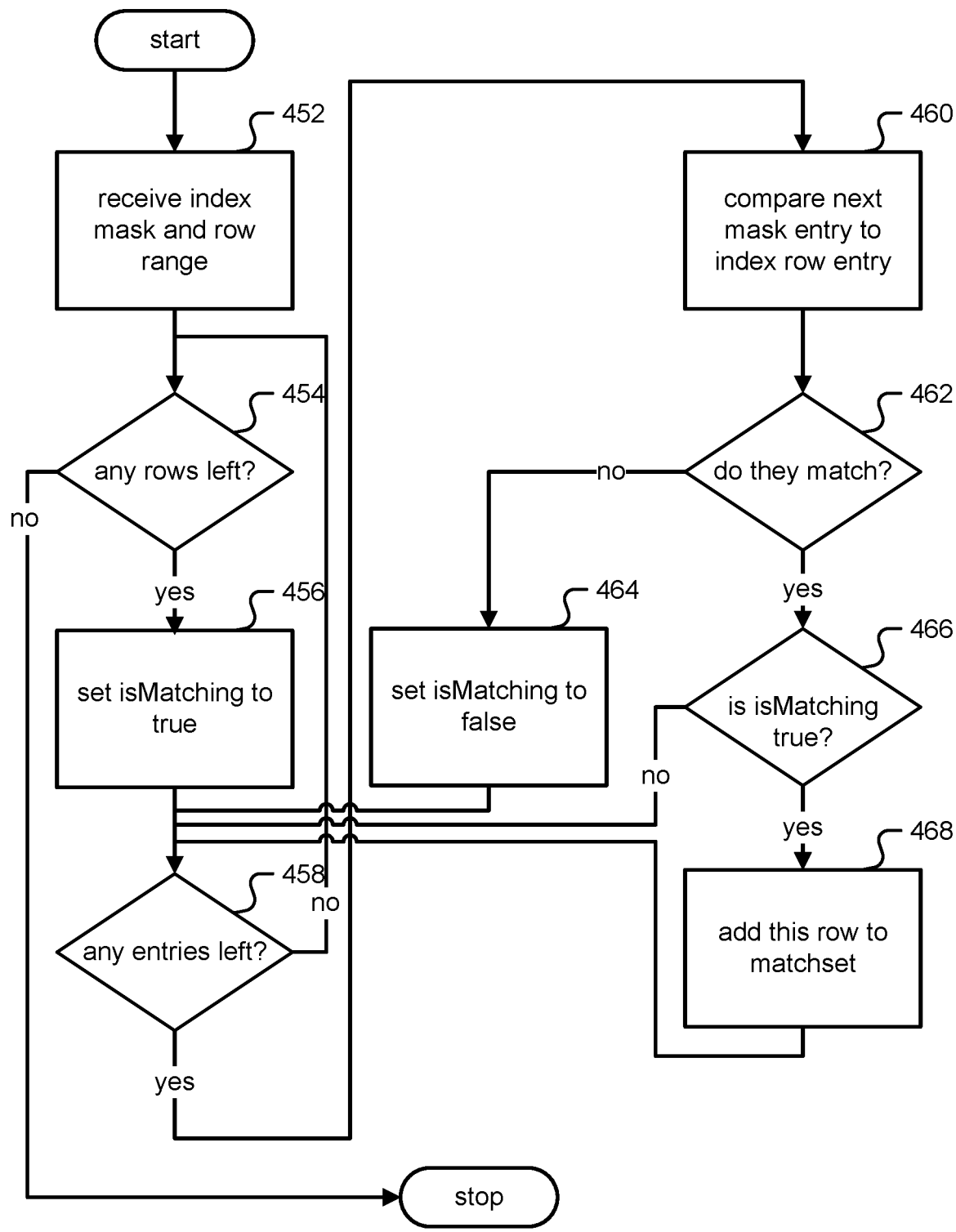
FIG. 4B is an embodiment of a process for a match operation.

FIG. 4B is an embodiment of a process for a match operation, corresponding to pseudo-code as follows:

```
receive an index mask and a row range //step (452) in Figure 4B
for each row in the row range of the index table { //(454)
    isMatching = true; //(456)
    for each entry in the mask and corresponding one in the
index row //(458)
        compare the mask entry to the index row entry //(460)
        if they do not ternary match { //(462)
            isMatching = false; //(464)
            break;   // out of this loop
        }
    if (isMatching) {   //(466)
        add this row to the matchset   //(468)
    }
}
```

Thus, a disclosed improvement is an approach of scanning an N-entry index table (302) of FIG. 3 using multiple indexes (202) of FIG. 2 to avoid a full scan of a data table (212/312) as shown in both FIGS. 2 and 3. The index table (302) of FIG. 3 is optimized to make it more efficient to scan than to scan the original underlying data table (312). That is, the emphasis is on optimizing the index table scan, rather than avoiding an N-row data table scan by the use of conventional index schemes. The key focus is on applications in which the sparseness of the data table (312) makes it more efficient to use an index table (302) of FIG. 3 than use conventional indexes (202) as shown in FIG. 2.

Root Cause Analysis as an Application of Index Table.

On such application where the sparseness of a data table (312) makes it efficient is automatic root cause analysis using ternary fault scenarios. A symptom is referred to herein as a named and/or defined state of some component of a monitored system that is important to distinguish one fault scenario from another. In one embodiment, a symptom value corresponding to an "unknown" value corresponding to a symptom value that is not known, and a "don't care" value, also referred to as an extraneous value corresponding to a symptom not needed for a particular analysis are used.

In one embodiment, each symptom value is restricted to being one of: true, false, or unknown. Thus, a symptom value is referred to herein as being a "ternary" value. In one embodiment, the unknown and the "don't care" values are designated by the same value, distinguished as one or the other based on the context of usage.

Overview of Automated Root Cause Analysis (ARCA).

Complex monitored systems may have numerous sources of faults and even the mechanisms for monitoring such a system are subject to failures as well. For example, a temperature sensor monitoring a refrigeration system can fail, either permanently or intermittently, indicating incorrect temperatures for the system being monitored.

Component dependencies may introduce further complexity, for example, the cooling coils in a refrigeration system depend on correct operation of the compressor to provide condensed refrigerant. These dependencies arise from the interconnection of these components. As described above, the failure of one component may lead to another indicating a fault condition/symptom. Consequently, when one component has a fault, it may lead to cascading faults in the components that are dependent on the faulting component, making the task of determining the actual root cause fault difficult. In some cases, the root cause may not even be present among the alerts provided to the operator.

For example, if a cable fails between two computer network switches, there may be a flood of alerts from the switches at either end of the cable. However, there is typically no alert directly indicating the cable break because there are no sensors directly on the cable able to detect a cable breakage. A complex system may also be implemented in multiple layers, creating another set of dependencies. These layer dependencies are another source of alerts. For example, the above cable failure may cause the transport layer to indicate it has sessions timing out because no acknowledgements are being received. Similarly, a misconfiguration at the IP layer may cause alerts at the TCP/transport layer and routing layer to be generated.

Traditionally, these extra alerts are referred to as symptoms of a root cause fault. Generating a large number of these symptoms as alerts makes determining the actual root cause more difficult.

By using efficient matching of symptoms without requiring the use of statistical correlation between faults or impractical/costly large training datasets, an efficient way of encoding the principles of operation, the dependencies and causations, and the potential root causes that are known for an engineered system as a result of its engineered design is described. This efficiency reduces storage costs and/or decreases power consumption for processors in order to determine root cause analysis. This efficient way allows root cause analysis to be performed automatically and efficiently.

Symptoms and Fault Scenarios.

Figure 5A:
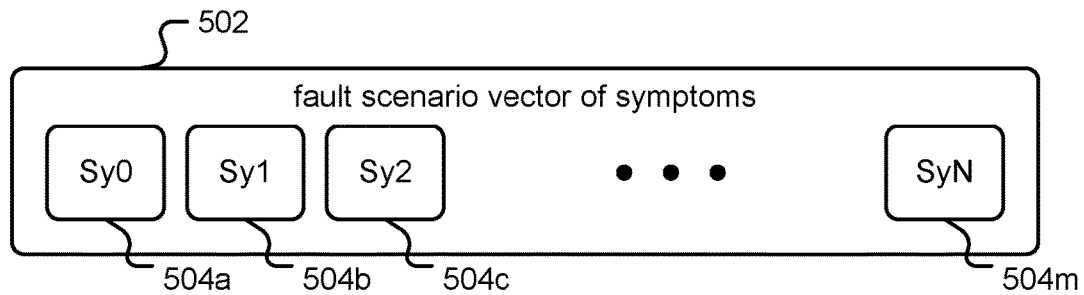
FIG. 5A is an illustration of a fault scenario vector of symptoms.

FIG. 5A is an illustration of a fault scenario vector of symptoms. One example of a symptom, noPower, is a symptom indicating that there is no power coming to the monitored system. The state of a symptom may be a known value or a special indication that it is unknown and/or "don't care." The term "don't care" is commonly used in digital logic to indicate that the associated item is extraneous/not required. The ability for the processing to indicate "don't care" for a given symptom allows analysis to proceed even when that aspect of the state of the system is not actually known.

A fault scenario is referred to herein as a collection of symptom values that indicates the known and unknown fault state of a monitored system. Logically a fault scenario represents the state and/or potential partial state of the system from the standpoint of observed/determined symptoms that something is wrong or not wrong with the system. It may not indicate the full state of the system. For example, with a vehicle, the fault scenario may not necessarily indicate the position, velocity, and so forth of the vehicle, only the state of the symptoms, that is, the aspects that are needed to perform root cause analysis of faults.

As shown in FIG. 5A, in one embodiment, a fault scenario is represented as an array of values (502), where each entry (504a-m) corresponds to a specified symptom. For example, symptom Sy0 (504a) is a first entry, symptom Sy1 (504b) is a second entry, and so forth. In one embodiment, there may be multiple symptoms associated with the same metric. For example, there may be different symptoms for a temperature sensor being slightly high, moderately high, and extremely high. In one embodiment, there may be symptoms associated with the same metric based on different levels of derivative. For example, a symptom may be associated with a metric having a first derivative that is zero for too long, that is, it is constant, often indicating that the input sensor has failed. A symptom may be associated with the first derivative being too high, meaning that it is changing too quickly.

There may be additional symptoms associated with a metric that indicate that the metric is out-of-range or behaving incorrectly. In this case, the out-of-range symptom is set at the same time as a symptom indicating the metric is too high or too low, for instance. This "aggregate" form of symptom may allow a fault scenario to be specified in terms of "out of range," rather than having to cover both "too low" and "too high."

A match operator is defined between two fault scenarios s0 and s1 to return true bool isMatching=match(s0,s1);

if every symptom entry in s0 is either "don't care" or else matches as the value in the corresponding entry in s1. Note that the match operation is not commutative; match(a,b) may not necessarily be equal to match(b,a).

Root Cause Table.

Figure 5B:
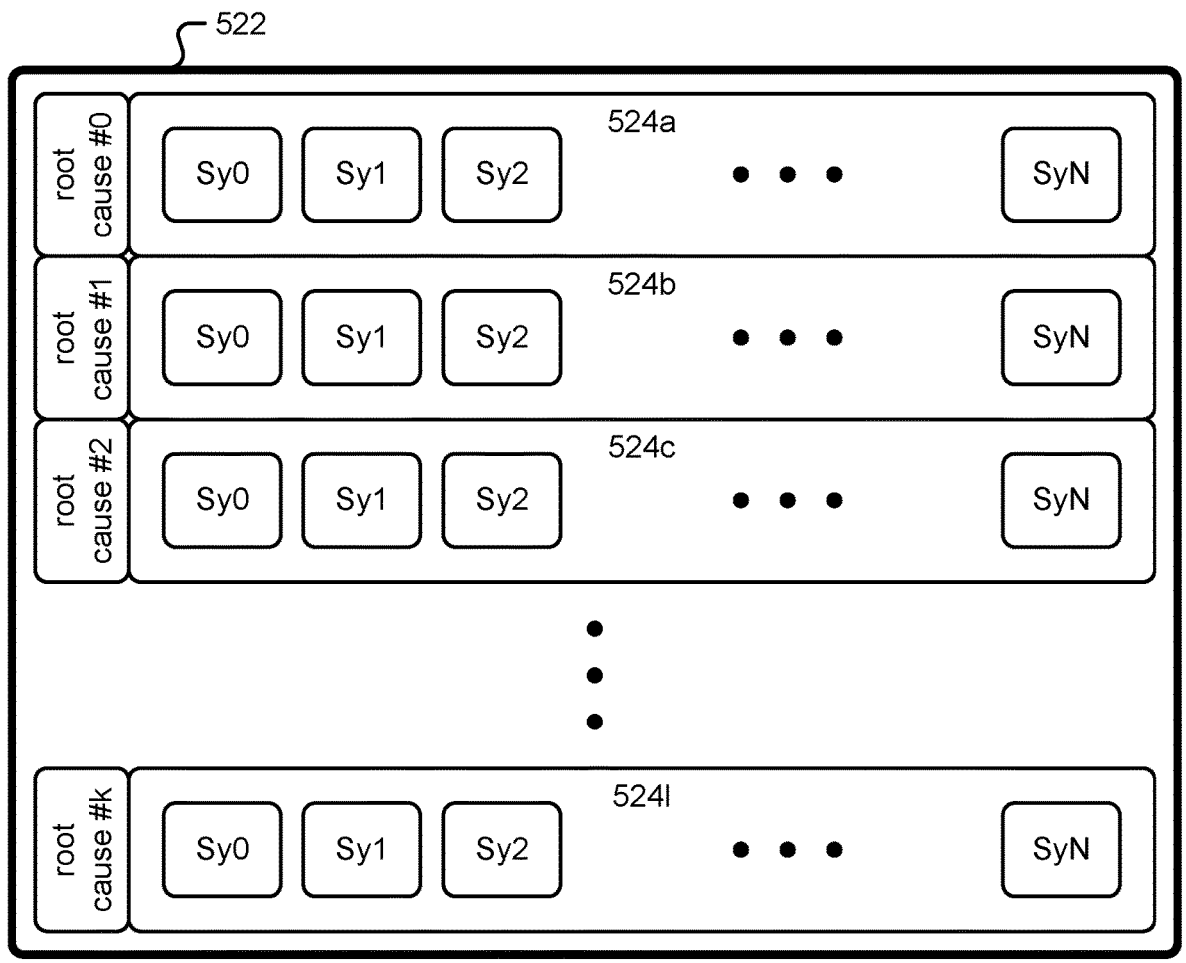
FIG. 5B is an illustration of a root cause table (RCT). An

FIG. 5B is an illustration of a root cause table (RCT). An RCT is a table in which each row is a fault scenario that is labeled with an associated root cause. In this context, an unknown value for a symptom in such a fault scenario is interpreted as "don't care." For example, for a root cause "bad motor," symptoms in the row may be: noPower as false, motorNotRunning as true, and all other symptoms indicated as "don't care."

In one embodiment, an RCT contains a row for every failure or event that can be the root cause, where each row indicates the symptoms that must be true for this to be the root cause, those that must be false, and the rest set as indicating "don't care." Note that specifying more symptoms as specific values, rather than "don't care" beyond the absolute minimal for a given root cause can result in a root cause not being identified or matched because extra symptoms may not be known or are the opposite of that specified for the row. Consequently, it is important to specify the minimal set of known symptoms required to diagnose the system to the particular root cause associated with the row in the table. If a given root cause may have multiple identifying sets of symptoms, there are multiple rows in the RCT, as a row per set. A given root cause may have multiple corresponding rows because one row corresponds to a minimal set of symptoms and others correspond to the minimal set with additional symptoms that provide greater confidence in the root cause. For example, in the case of a power supply failure to a switch, the minimal set may just contain the "lossOfPower" symptom from the switch's current sensor while additional rows may contain that symptom plus "lossOfSignal" symptoms from the directly attached switches to the failed switch.

In one embodiment, each RCT row is represented in the same way as a fault scenario. As such, it may be referred to herein as a "potential fault scenario." As shown in FIG. 5B, an RCT (522) comprises k+1 rows (524a-524l), each row associated with a specific root cause with N symptoms per row. For example, root cause #0 is associated with the first row (524a). The values of the symptoms (504a-m) in each row (524a) are different from the other rows (524b-524l), each corresponding to a potential fault scenario for the associated root cause, as indicated by the root cause labeled #0 through #k.

In contrast to a potential fault scenario, the fault scenario determined from a monitored system is referred to herein as an actual fault scenario. There may be multiple actual fault scenarios for a monitored system. One actual fault scenario may be a more detailed fault scenario for a particular subsystem compared to another. Another source of multiple actual fault scenarios is uncertainty regarding the faults. For example, one scenario may have a symptom corresponding to the temperature of the system being too low whereas another may have a symptom indicating that the temperature sensor has failed. In the latter case, it may indicate the temperature sensor-dependent symptoms as unknown.

As described above, ternary symptom values are used so that a symptom is represented as a "known" bit indicating known or unknown by being true or false respectively, and a second "value" bit that indicates true or false, which is only interpreted as such if the known bit is set to true. The quaternary nomenclature of [a, b] is used, again such that an interpretation of [0,1] that is allowable is that an associated symptom is not known to be true. Thus [0,0] which may correspond to unknown differs from [0,1] which may be interpreted as not known to be true. Note that a [0,1] symptom in an entry in an RCT (522) may match to an input being false or unknown unlike [0,0], which just does not match to true. Again, [0,1] may not necessarily be treated the same as [0,0] and/or not allowed.

Figure 5C:
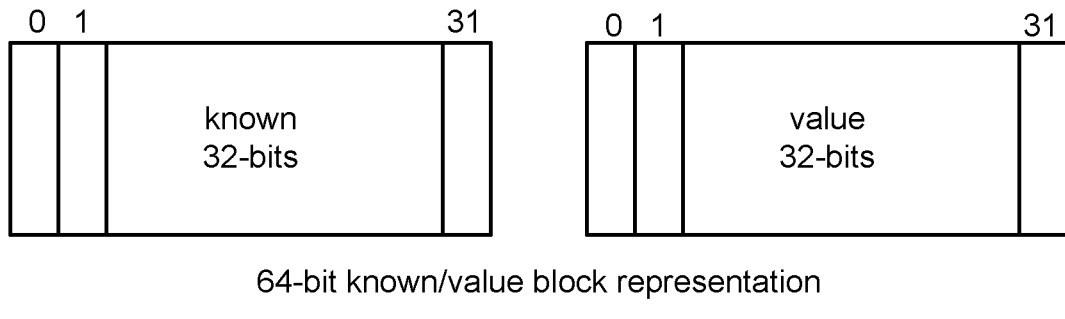
FIG. 5C is an illustration of a 64-bit block representation of known and value bits.

FIG. 5C is an illustration of a 64-bit block representation of known and value bits. In one embodiment, a fault scenario is represented as blocks of bits that are partitioned into a sequence of "known" bits and a sequence of value bits. For example as shown in FIG. 5C, an implementation uses 64-bit blocks, wherein the first 32 bits are "known" bits and the second 32-bits are value bits. Referring to FIG. 5C, if the i-th known bit is 1, the i-th value bit indicates if the corresponding symptom is true or false; otherwise the actual value is not known and the i-th value bit is not meaningful. This embodiment allows efficient determination of the "known" bits in a block. It also means that a block need not be stored if all the symptoms in a block are unknown or "don't care." That is, absence of an explicit storage of a block is interpreted as that block containing only "don't care" values.

Figure 5D:
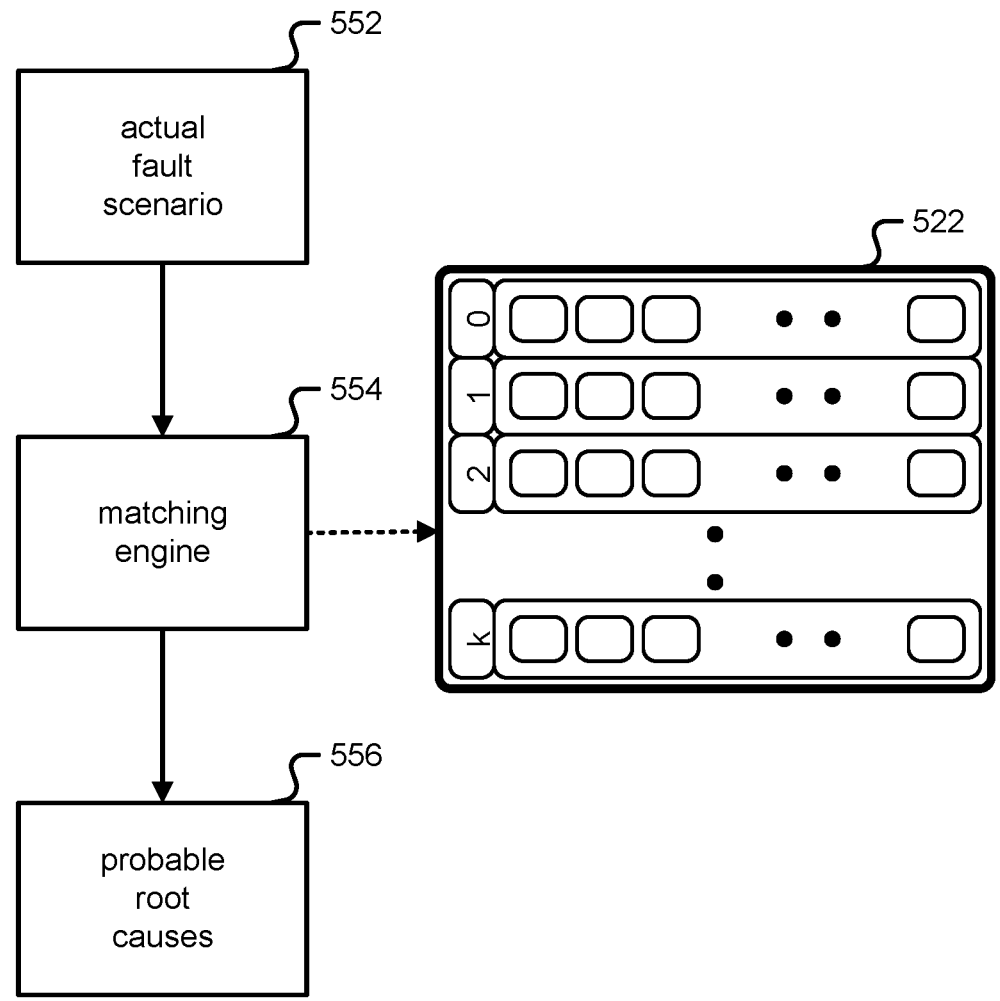
FIG. 5D is an illustration of a root cause analysis technique.

Root Cause Analysis. FIG. 5D is an illustration of a root cause analysis technique. Actual root causes associated with a given actual fault scenario (552) are determined by using a matching engine (554) to match the given actual fault scenario against each row in the RCT (522), and indicating the ones that match as probable root causes. That is, if a fault scenario matches a row such that each entry matches by the above match(a,b) operator, the root cause associated with that row is output as a probable root cause (556) associated with this symptom, as shown in FIG. 5D.

This matching is essentially "ternary matching" but unlike the ternary matching provided by a ternary content-addressable memory (T-CAM), the input fault scenario is also ternary. A T-CAM may however be used as part of an efficient/hardware system of matching. There may be multiple simultaneous root cause failures in a monitored system. Therefore, it is possible that the matching matches multiple rows in the RCT, one per root cause. For example, a motor may fail at the same time that a temperature sensor has failed by indicating completely unrealistic readings. There may be multiple rows that map to the same root cause. This handles the case in which a root cause failure may be indicated by different sets of symptoms.

In one embodiment, the row representation does not explicitly store "don't care" entries. That is, the absence of an explicit designation or representation of an i-th symptom is interpreted as "don't care" for the i-th symptom. In one embodiment, symptoms are aggregated into blocks that are associated with logical units or components of a monitored system. For example, an embodiment may use the 64-bit block of known/value bits described earlier. Thus, if a component is not relevant to a particular root cause, the entire block need not be stored. Each row may then require a relatively small amount of storage. Typically, most rows are relatively sparse because only a small subset of symptoms is relevant to a particular fault so only a small percentage of that row is actually stored, with the rest by default being "don't care."

The representation of arbitrary fault criteria is achieved by using multiple symptoms. For example, one root cause is evidenced by a temperature being very high, yet another is evidenced by it being high, and another evidenced by it being slightly high. That is, there may be a symptom entry in each row for each of these levels.

A key element is indicating the symptoms that are known to be false as a symptom, that is no fault, as well as what is known to be true, that is a fault is present, while still allowing for unknown or "don't care." The false case effectively filters out symptoms that are due to another reason, for example the compressor is not working, but actually there is no power, which is the root cause. Thus, a subsystem SSi that is dependent on a number of other subsystems may need to have all these other systems known to be working before a fault in subsystem SSi may be reliably identified as a root cause.

In one embodiment, the system may record if any symptoms changed in an actual fault scenario since its last matching and only re-match the actual fault scenario to the RCT (522) if so. This check avoids the overhead of re-matching when there is no change to the actual fault scenario.

In one embodiment, the frequency of re-matching is configurable according to application requirements. For example, ARCA matching may be configured to be performed every 30 minutes in a refrigeration system to minimize the cost of the matching because a fault does not result in immediate problems and the resulting delay in detecting a fault does not significantly impact the meantime to repair. This low rate of matching assumes that a fault that is transient enough to appear and then disappear before the matching takes place, and thus is not present in the actual fault scenario at the time of the matching is not critical to detect.

RCT Hierarchy.

Figure 5E:
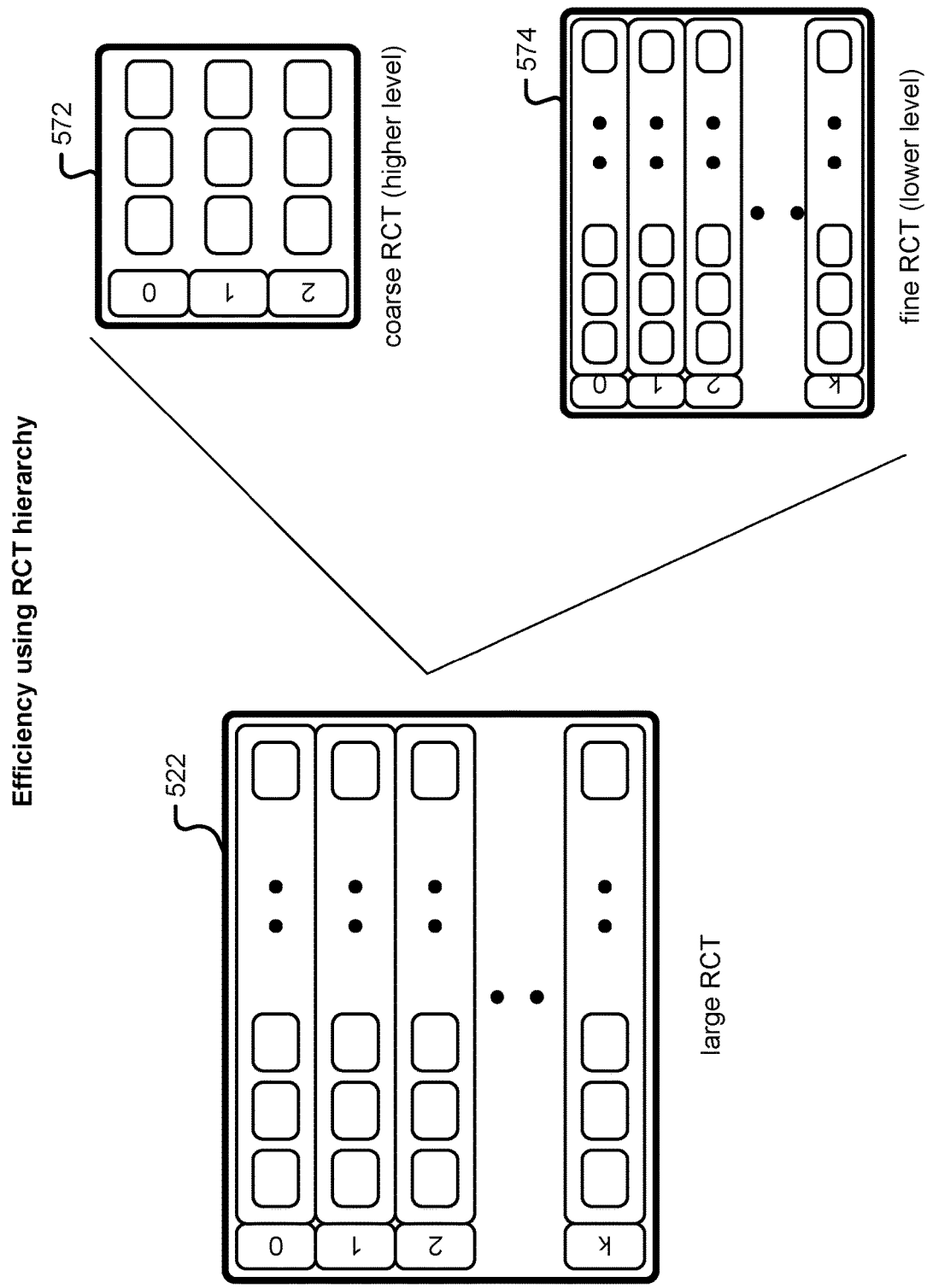
FIG. 5E is an illustration of RCT Hierarchy.

FIG. 5E is an illustration of RCT Hierarchy. In one embodiment, there may be a hierarchy of RCTs corresponding to different levels of root cause analysis. For example, a refrigeration system RCT (522) may be partitioned such that it has a top-level RCT (572) that "root causes" the high-level reason that the system is not performing well, which could be one of: 1) not maintaining the desired temperature, and 2) consuming excessive energy. Once this top-level RCT (572) indicates one of these causes, a next level of monitoring and corresponding RCT (574) may be automatically deployed, depending on the specific cause, to provide a more specific root cause for the top-level root cause. For example, if the top-level root cause for not performing well is excessive energy consumption, additional telemetry and analysis can be deployed to detect the symptoms of low coolant, icing on the coolant coils, supercycling of the compressor, failure of the current sensor, and other possible root causes of the excessive energy consumption. This next level root cause may be sufficient to indicate the necessary repair to the system. Alternatively, a next level of RCT (574) and processing can be automatically dispatched based on the root cause determined at this second level.

This hierarchical processing may reduce the resources consumed by root cause analysis in the case in which the system is operating normally. It also may reduce the resources required to root cause a specific failure if the next level of root cause analysis only needs to handle a subset of possible symptoms based on the indication of the root cause at the higher level. For example, using the above case of a refrigeration system, knowing that the problem with the system is excessive power consumption, the next level root cause analysis processing that is actually deployed may require a smaller RCT (574) and less telemetry and processing compared to this level of root cause analysis that is configured to detect both failure to maintain configured temperature as well as excessive power consumption. Alternately, if both top-level symptoms are arising, there may be no such savings. However, it is feasible to run the two instances of this detailed root cause analysis in parallel as separate processes, which is time efficient.

Generally, the root cause analysis matching may be performed in parallel by partitioning the RCT across multiple parallel threads and collecting the output of each. Because the matching does not modify the actual fault scenario or the RCT and because the matching is order-independent across the rows, the only synchronization required between the threads is on the output to the aggregated root cause set.

Multi-layer, partitioning, and this hierarchal approach reduces the size of the RCT significantly. For example, in a network application, if a higher-level RCT such as basic connectivity only considers four symptoms per node of a network rather than 256, the RCT may be reduced in size by a factor of almost 64. The size may be further reduced by only having coarse-grained root causes in the basic RCT. For instead, a large number of specific problems for a link may be handled at this level by a simple "link-problem" as the root cause, which when identified may cause the dispatch of a more detailed ARCA using the full set of possible specific link issues.

Besides reducing the size of the RCT that needs to be actively accessed in the common case in which there are no faults, this smaller RCT is more efficient to process. Also, with sufficient reduction in size, the fault scenario vector may potentially fit into a hardware T-CAM so that matching may be done in hardware. In one embodiment, where there are multiple similar independent units to root cause, such as with multiple roof-top-units (RTU) in the case of an HVAC application, a single RTU RCT may be used to pass a fault scenario vector for each separate RTU into the T-CAM in sequence, to detect faults in each RTU.

A benefit of such a hierarchical approach is that the basic ARCA is expected to be the common case, namely when the equipment is performing correctly, so the T-CAM may be very efficiently handling the common case, and the detailed ARCA may be reserved for when there is actually a problem. Another benefit is that the more basic ARCA allowed by the hierarchical approach may mean that less telemetry is being collected when there are no faults, which again may be the common case. Thus, a hardware implementation, for example using a T-CAM or equivalent, which may currently be realized using SRAM, is practical and attractive in some applications.

ARCA and Index Tables.

As can be seen in comparing FIGS. 3 and 5B, the index table (302) corresponds to the collection of potential fault scenarios (522), one potential fault scenario per row (524). A symptom (504) corresponds to a subcondition entry in the table. For example, with a data table (312) consisting of a row (314) per oven in a factory and an entry corresponding to the temperature of the oven, an index (306) corresponding to "temperature over threshold" would have entries set to true in the column in the index table (302) corresponding to this subcondition for each row (304) in which the corresponding oven is over the temperature threshold. Thus, the entries in the set of potential fault scenarios for a given symptom, for example Sy2 in FIG. 5B, correspond to an index, and thus a column (306), in the index table (302). The output/probable root causes (556) of FIG. 5D thus correspond to matched rows in the generic index table approach. The actual fault scenario (552) corresponds to the mask (402) in the generic index table approach. And, the NULL value is the special value that corresponds to "don't care" or "not known," wherein NULL is the term traditionally used in database literature. With this translation of terms, the matching method (554) used in ARCA is similar to the matching method used in index tables (302), with the match logic/comparison reversed between the mask and row in the query usage.

In one embodiment, one or more of the indexes in the table are bitmap indexes, extended with the capability to indicate a "don't care" value as well as true and false. This corresponds to the ternary or quaternary matching described above. The minimal representation for ternary or quaternary representation and matching is two bits, using the known/value representation of the original application, as illustrated in FIG. 5C.

Figure 6:
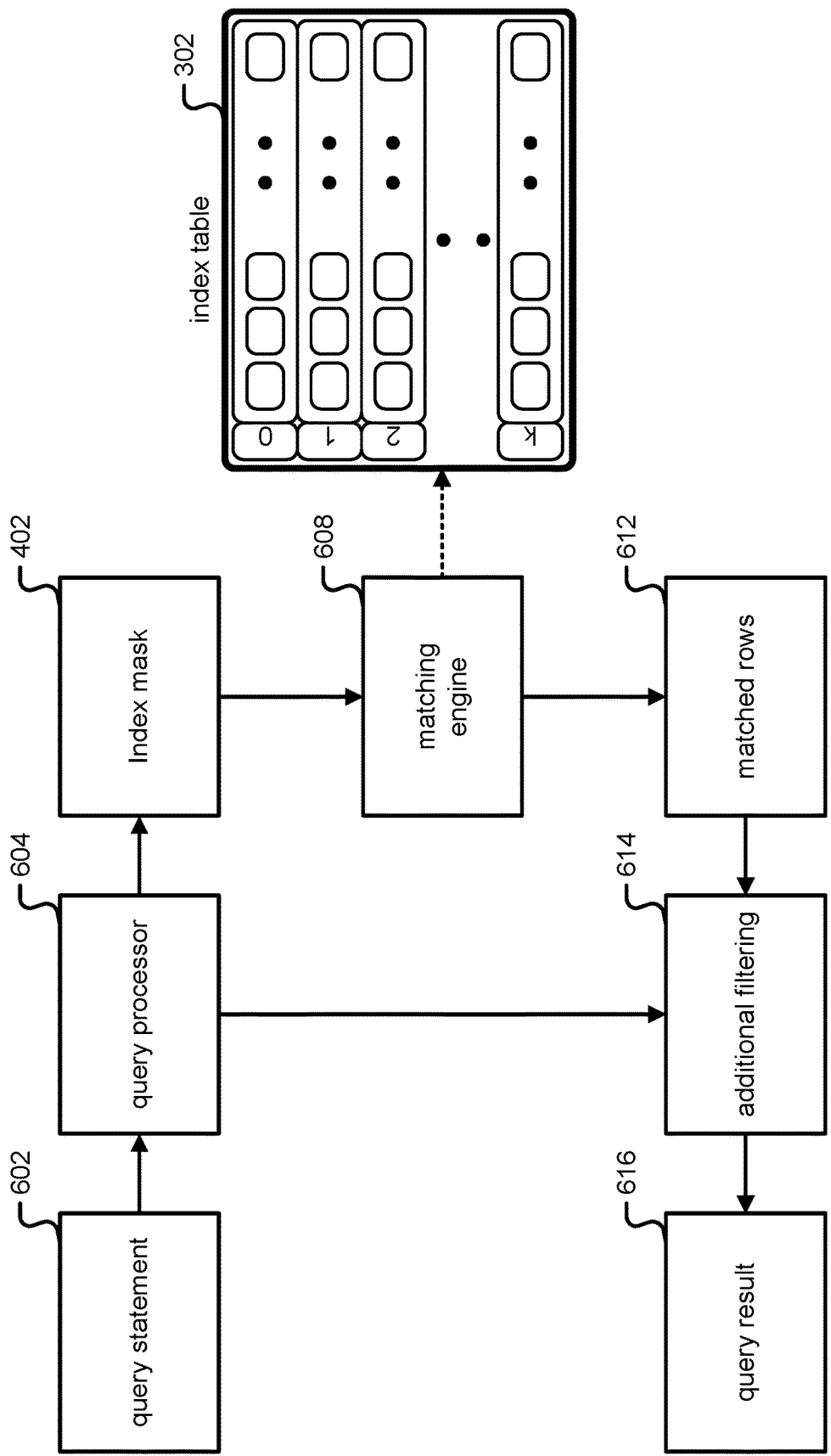
FIG. 6 is an illustration of a query flow using an index table.

FIG. 6 is an illustration of a query flow using an index table. As shown in FIG. 6, the query flow using an index table is analogous to the ARCA technique of FIG. 5D. A query statement (602) is received, wherein a query processor (604) processes the statement to form an index mask (402). The matching engine (608) then matches index mask (402) to index table (302) to produce matched rows (612) as output. The query processor (604) then provides additional filtering (614) to process a query result (616). For example, the query can request all salaried employees in engineering with a salary over $50,000 that were hired in the past 6 months. If the table supports subconditions corresponding to isSalaried and isEngineer and isOver500000, the additional filtering is checking in each matched row that the hire date is within the past 6 months, removing each matched row for which the check fails from the match set.

Thus, ARCA using ternary fault scenario representation is a specific application of the index table (302) when comparing FIG. 6 and FIG. 5D. In particular, root cause analysis may be regarded as being realized as a query (602) to the index table (302)/RCT (522) to determine the one or more rows that match (554, 608) the set of symptoms specified in an index row mask (402)/actual fault scenario (552), and then mapping each of the rows to a corresponding matched row (612)/probable root cause (556). The only difference is that the comparison is reversed in the case of a database query.

In the ARCA application, there may be no need to refer to the actual data table of telemetry as part of responding to the query. In fact, it may not be necessary to even maintain a data table of incoming telemetry, but rather just respond to each telemetry update by setting or unsetting a symptom in the actual fault scenario, if any change is required at all. Moreover, because the subconditions, also known as symptoms, are selected based on those required to determine a root cause fault, the index table (302) itself is typically extremely sparse.

Evaluation of Rule Conditions in Rule-Based System Application.

Another general application domain for index tables is for the evaluation of rule conditions in a rule-based system. The challenge in this scenario is determining which rule conditions are actually true in order to decide which rule actions to execute. Using the index table (302), the approach is to have a row (304) per conjunctive rule condition for each rule in the rule set of interest. Each row (304) specifies the subcondition values for this rule, with NULL and/or "don't care" for those subconditions not relevant to the rule. Each such row (304) references directly or indirectly the corresponding rule action. In this use case, the match operation is applied in the same order as with ARCA.

If a rule contains a condition that is a disjunction of two subconditions SC0 and SC1, there is a row corresponding to SC0 and one that corresponds to SC1, both mapping to the same rule action. A match operation on the index table (302) with a mask (402) that indicates the current subconditions then provides references to the rules whose conditions are satisfied (612), allowing these actions to be further refined (614) and then be performed. In this way, the index table supports efficient determination of which rule conditions are true, allowing the rule-based system to execute properly. The query form of match can be used on the same table to support queries on rule conditions, e.g. all the rules that are applicable to when the temperature "isTooHot".

Referring to FIG. 3, a full scan of the index table (302) is less costly compared to a full scan of the data table (312) in a target application domain of sparse data for several reasons:
- the size of the index table (302) is smaller than the size of the data table (312) because there may be just two bits per entry as shown in FIG. 5C, rather than a full value of 32 or 64 bits or even larger, in the case of descriptor, array or string values;
- the index table (302) can be structured or laid out in memory to optimize the scan more easily because it is smaller and, in many cases of subconditions, changes far less frequently;
- the subcondition index table (302) may efficiently represent subconditions of interest, such as temperature over threshold, rather than requiring the application to compute that subcondition. Therefore, the number of memory accesses and the computing required to check a subcondition are reduced.
- For a simple example, checking a threshold using the raw data values, without a subcondition indication, requires:
  1. reading the current value as well as the threshold value;
  2. checking if the current value is known;
  3. branching out if not known;
  4. performing a comparison on those two values; and
  5. branching based on result of the comparison.
- By contrast, checking the threshold condition in the index table is just testing the associated 2-bit value. For example, if the subcondition is "isTooHot" corresponding to some current temperature value being over a configured threshold, if the corresponding input entry is [1,1] indicating that this subcondition is true, the match just entails checking that the corresponding entry in a row is also [1,1]. Moreover, with the block representation specified in FIG. 5C or similar and 64-bits of known and 64-bits of value, the evaluation is performed in a match operation as part of evaluating 64 such subconditions at a time, so is almost 100 times more efficient.

Referring to FIG. 3, in one embodiment each index table row (304) has an associated collection of pointers or IDs that refer to rows (314) or objects in the underlying (312) data table(s) or datasets. In this case, when a match operation (608) as shown in FIG. 6 matches on a row, it adds the contents of this per-row collection to the result set (612) it is generating. This collection can also be a conventional index for these rows on a secondary subcondition. In this case, if this secondary subcondition is known, only the rows in this secondary index collection that satisfy the secondary subcondition for this query are added to the result set (612). Using this per-index row collection, the index table (302) can also be structured to handle multiple data tables or datasets, similar to a database cluster. In this case, a row (304) in the index table (302) may explicitly indicate in its associated collection both the table and the row for those rows or objects associated with this matched index table row, allowing for multiple tables.

Continuing the earlier example, there may be a table (312) of criminal offenders and a table of acquaintances/family members of a crime victim. An index table (302) may be constructed to indicate per-row both the criminal offenders and the acquaintances that match a given description. Then, a query with a given description may return rows in either one or both of the tables. This per-index row collection can reduce the number of index rows when multiple rows match on the same index subconditions, whether in the same table or different tables.

In one embodiment, the match operation is parallelized, by partitioning the index table (302) into K partitions as row ranges, running parallel submatching threads on each partition, and then merging the results from each of the threads to produce a final match result. This parallel execution is feasible because the match operation (608) is not changing the index table (302) or the mask (402) and there is no order dependent on matching to each of the rows. Thus, different threads may be matching in parallel on the different row ranges.

Because of its relatively simple processing, the match operation (608) may be optimized in numerous other ways including by executing the matching in dedicated hardware, as described above with T-CAM.

Figure 7:
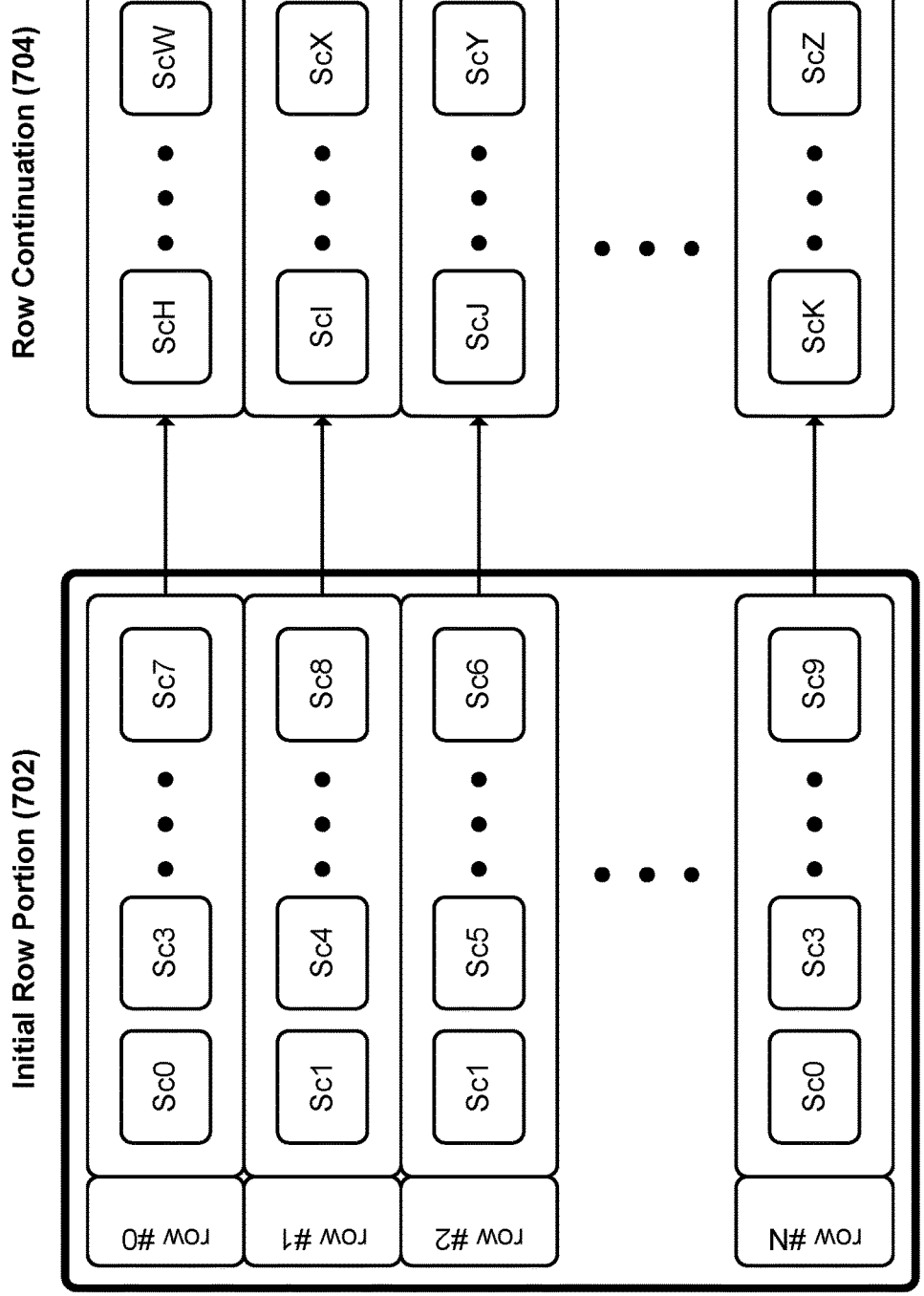
FIG. 7 is an illustration of a preferred layout for an index table. In software.

FIG. 7 is an illustration of a preferred layout for an index table. In software, the index table (302) may be formatted in memory to minimize cache references. In particular, if the common case of not-matching requires looking at the first K subconditions on average, the table may be formatted as a contiguous memory region divided into blocks of a size that can hold K subcondition values plus a pointer to a continuation block.

This format is illustrated in FIG. 7 with three subcondition entries in the initial portion of the row (702) with a pointer to the continuation of the row (704). With this layout, the scan is sequentially accessing memory for most of the rows because there is a mismatch before having to access the continuation, allowing the processor prefetch mechanism to work effectively, thereby reducing latency and memory bandwidth.

In some applications, the index table (302) may be optimized by ordering it as essentially a clustered index based on some subcondition. For example, continuing the example of a criminal offender table, if the rows of the index table are ordered by the age of the offender, when the age range of the person of interest is known, the match operation on the table may be limited to the corresponding range of rows, reducing the cost of the matching. This restricted row range was specified as an input to the match operation in the pseudo-code described above.

Similarly, if the data table (312) logically contains T different types of objects, the index table may be organized into T different ranges. Then, when the type of the object to be matched is known, the match operation may first determine the relevant row range and then only perform the match operation over that row range, reducing the number of index table entries that need to be scanned. In some applications, it is feasible to further order the rows within a range into subranges that correspond to yet another subcondition, further restricting the range of rows that need to be matched. Note that this clustered indexing is applied to the index table (302), not the underlying data table (312), as is done traditionally.

Figure 8:
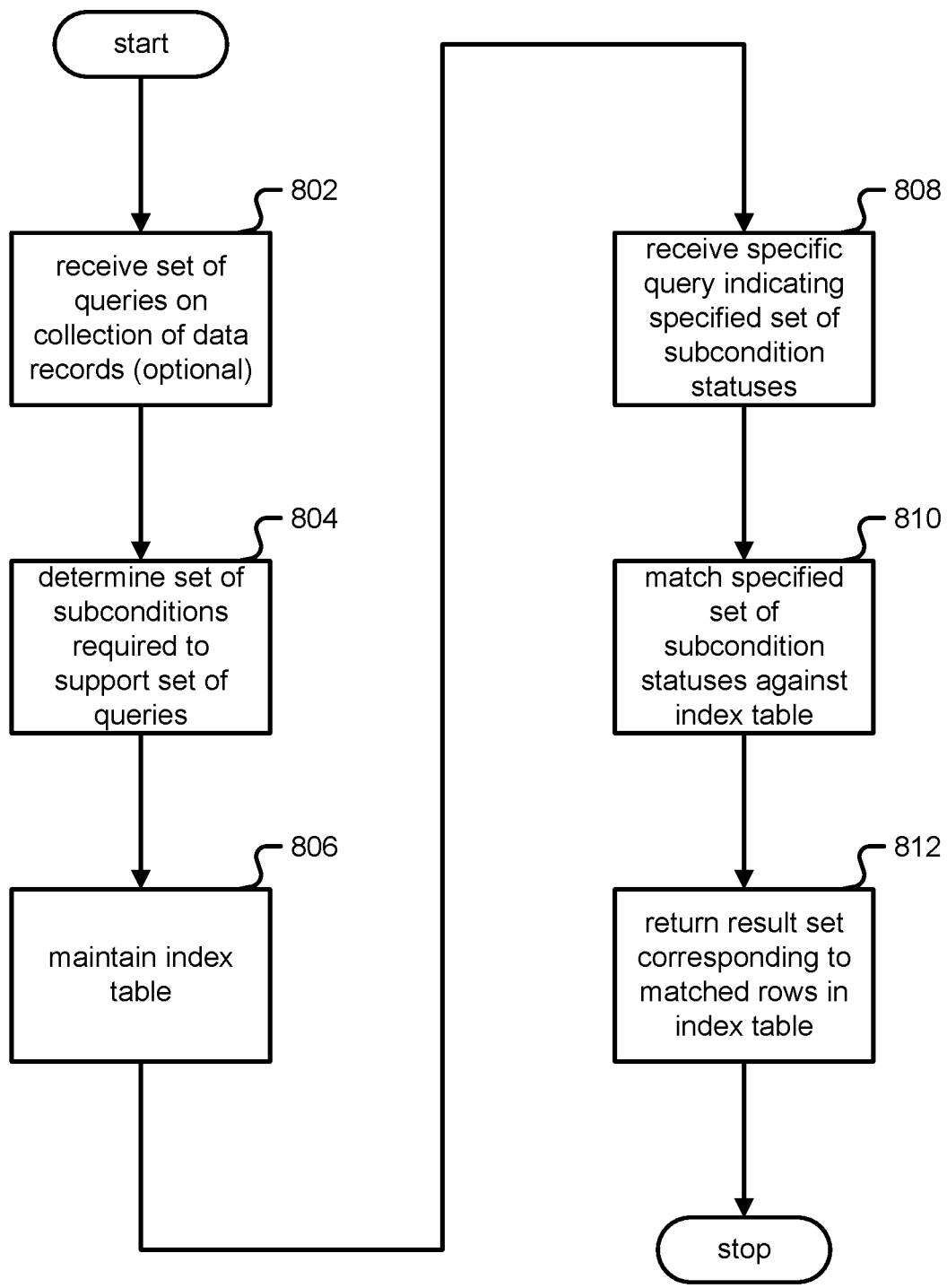
FIG. 8 is a flow chart illustrating an embodiment of a process for queries on data records using an index table.

FIG. 8 is a flow chart illustrating an embodiment of a process for queries on data records using an index table. In one embodiment, the process of FIG. 8 is carried out by the system in FIG. 6 and/or the computer in FIG. 1.

In optional step (802), a set of queries on a collection of data records, for example in a data table, are received. In step (804), referring to FIG. 3, a set of subconditions (306a, 306b, 306c, etc.) required to support a set of queries on data table (312) is determined. For example, a subcondition corresponding to a "temperature over a threshold" for a system with frequent queries regarding temperature monitoring would have entries set to true in a column in the index table (302) corresponding to this subcondition for each row (304) in which the corresponding oven is over the temperature threshold. In one embodiment, this comprises determining a column in the index table. For example, an index table may be a collection of a plurality of indices (306a), (306b), (306c), . . . , and so forth.

Returning to FIG. 8, in step (806), an index table (302) is maintained. In particular, an index table is stored and updated as appropriate, wherein each entry in the index table indicates a status of a subcondition associated with a column. In one embodiment, a status type of the status of the subcondition is ternary. In one embodiment, the status of the subcondition comprises a "don't care" state. In one embodiment, the status of the subcondition comprises at least one of the following states: "don't care," true, and false. For example, for a subcondition corresponding to a "temperature over a threshold," the entry is set to true when the temperature is over a threshold, false when the temperature is not over a threshold, and "don't care" if the status is unknown or the status is "don't care." Thus, the index table (302) may efficiently represent the subconditions of interest, such as temperature over threshold, rather than requiring the application to compute that subcondition. Therefore, the number of memory accesses and the computing required to check a subcondition are reduced. In one embodiment, a same status type is used in a given column. In one embodiment, a status type is a representative numerical value. For example, rather than a ternary status type reflecting whether a person is a gun collector [true, false, don't care], a status type may reflect a number of years that a person has been a gun collector [0, 1, 2, 3, 4, 5+]. In one embodiment, this includes maintaining the index table with an index record per data record.

In step (808), a specific query indicating a specified set of subcondition statuses is received. For example, referring to FIG. 6, a query statement (602) is received for processing by a query processor (604). For example, a query processor (604) may take the set of queries and process them into an index mask (402). In step (810), the specified set of subcondition statuses (402) is matched against the index table (302). For example, a matching engine (608) matches the subconditions with entries in the index table, based on the pseudo-code above. In step (812), a result set corresponding to matched rows (612) in the index table (302) that match the specified set of subcondition statuses is returned, for example as a query result (616). In one embodiment, an optional step not shown in FIG. 8 includes updating the status fields in the index table as new data is received to reflect a status of affected subconditions. In one embodiment, the index table rows are ordered by subcondition criteria. For example in a criminal offender table, rows of the index table may be ordered by the age of the offender, when the age range of the person of interest is known. The match operation on the ordered table may thus be limited to the corresponding range of rows, reducing the cost of the matching, for example if one was looking for someone age 44, they may look between the range of rows from age 40 to age 50.

In summary, supporting a set of queries on sparse data using index tables leverages the efficiency of ternary matching, with the advantage of reducing processor power and decreasing query response time, without requiring indices that resolve NULL values, with the advantage of reducing memory space requirements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
obtain a set of subconditions required to support one or more queries on a collection of data records;
maintain a sparse data index table, wherein an entry in the sparse data index table indicates a subcondition status of the obtained set of subconditions associated with a data record in the collection of data records, wherein the corresponding data record is interpreted to obtain the subcondition status, wherein the sparse data index table comprises a bitmap index, wherein the bitmap index includes one of ternary values as a subcondition status of a set of subcondition statues, wherein the ternary values includes true, false, and a null value, and wherein the null value represents an "unknown" state;
receive a specific query indicating a specified set of subcondition statuses, wherein the specific query relates to an index mask and a row range for the sparse data index table;
match the specified set of subcondition statuses against the sparse data index table, comprising to:
for a mask entry in the index mask and a corresponding entry of an index row within the row range:
compare the mask entry to the corresponding entry, wherein the mask entry specifies a value of one or more subcondition statuses, and wherein the mask entry to indicates true, false, or unknown; and
in response to a determination that the mask entry and the corresponding entry do not match, omit comparing other mask entries of the index mask with other entries of the index row; and
return a result set corresponding to matched rows in the sparse data index table, wherein the matched rows match the specified set of subcondition statuses, wherein a predefined set of known subcondition statuses required to diagnose the system to a particular root cause associated with the row in the table is specified, and wherein in an event that the result set matches the predefined set, the particular root cause is diagnosed;

wherein a specific index row of the sparse data index table is considered matched with the specified set of subcondition statuses if each index row entry of the specific row is considered matched with each corresponding entry of the specified set of subcondition statuses; and wherein a specific index row entry is considered matched to a specific corresponding entry of the specified set of subcondition statuses if the specific index row entry is an "unknown" state and the specific corresponding entry is a "true" state.

2. The system of claim 1, wherein to maintain the sparse data index table comprises to maintain the sparse data index table with an index record per data record.

3. The system of claim 1, wherein the processor is further configured to update status fields in the sparse data index table as new data is received to reflect a status of affected subconditions.

4. The system of claim 1, wherein a same status type is used in all columns in the sparse data index table.

5. The system of claim 4, wherein a status type includes a representative numerical value.

6. The system of claim 1, wherein index table rows are ordered by subcondition criteria.

7. A method, comprising:
receiving a set of queries on a collection of data records;
obtaining a set of subconditions required to support the set of queries;
maintaining a sparse data index table, wherein an entry in the sparse data index table indicates a subcondition status of the obtained set of subconditions associated with a data record in the collection of data records, wherein the corresponding data record is interpreted to obtain the subcondition status, wherein the sparse data index table comprises a bitmap index, wherein the bitmap index includes one of ternary values as a subcondition status of a set of subcondition statues, wherein the ternary values includes true, false, and a null value, and wherein the null value represents an "unknown" state;
receiving a specific query indicating a specified set of subcondition statuses, wherein the specific query relates to an index mask and a row range for the sparse data index table;
matching the specified set of subcondition statuses against the sparse data index table, comprising:
for a mask entry in the index mask and a corresponding entry of an index row within the row range:
comparing the mask entry to the corresponding entry, wherein the mask entry specifies a value of one or more subcondition statuses, and wherein the mask entry indicates true, false, or unknown; and
in response to a determination that the mask entry and the corresponding entry do not match, omitting to compare other mask entries of the index mask with other entries of the index row; and
returning a result set corresponding to matched rows in the sparse data index table, wherein the matched rows match the specified set of subcondition statuses, wherein a predefined set of known subcondition statuses required to diagnose the system to a particular root cause associated with the row in the table is specified, and wherein in an event that the result set matches the predefined set, the particular root cause is diagnosed;

wherein a specific index row of the sparse data index table is considered matched with the specified set of subcondition statuses if each index row entry of the specific row is considered matched with each corresponding entry of the specified set of subcondition statuses; and wherein a specific index row entry is considered matched to a specific corresponding entry of the specified set of subcondition statuses if the specific index row entry is an "unknown" state and the specific corresponding entry is a "true" state.

8. The method of claim 7, wherein maintaining the sparse data index table comprises maintaining the sparse data index table with an index record per data record.

9. The method of claim 7, further comprising updating status fields in the sparse data index table as new data is received to reflect a status of affected subconditions.

10. A computer program product, the computer program product being embodied in a non-transitory computer readable storage medium and comprising computer instructions for:
receiving a set of queries on a collection of data records;
obtaining a set of subconditions required to support the set of queries;
maintaining a sparse data index table, wherein an entry in the sparse data index table indicates a subcondition status of the obtained set of subconditions associated with a data record in the collection of data records, wherein the corresponding data record is interpreted to obtain the subcondition status, wherein the sparse data index table comprises a bitmap index, wherein the bitmap index includes one of ternary values as a subcondition status of a set of subcondition statues, wherein the ternary values includes true, false, and a null value, and wherein the null value represents an "unknown" state;
receiving a specific query indicating a specified set of subcondition statuses, wherein the specific query relates to an index mask and a row range for the sparse data index table;
matching the specified set of subcondition statuses against the sparse data index table, comprising:
for a mask entry in the index mask and a corresponding entry of an index row within the row range:
comparing the mask entry to the corresponding entry, wherein the mask entry specifies a value of one or more subcondition statuses, and wherein the mask entry indicates true, false, or unknown; and
in response to a determination that the mask entry and the corresponding entry do not match, omitting to compare other mask entries of the index mask with other entries of the index row; and
returning a result set corresponding to matched rows in the sparse data index table, wherein the matched rows match the specified set of subcondition statuses, wherein a predefined set of known subcondition statuses required to diagnose the system to a particular root cause associated with the row in the table is specified, and wherein in an event that the result set matches the predefined set, the particular root cause is diagnosed;
wherein a specific index row of the sparse data index table is considered matched with the specified set of subcondition statuses if each index row entry of the specific row is considered matched with each corresponding entry of the specified set of subcondition statuses; and wherein a specific index row entry is considered matched to a specific corresponding entry of the specified set of subcondition statuses if the specific index row entry is the "unknown" state and the specific corresponding entry is a "true" state.

11. The computer program product of claim 10, wherein maintaining the sparse data index table comprises maintaining the sparse data index table with an index record per data record.

12. The computer program product of claim 10, further comprising updating status fields in the sparse data index table as new data is received to reflect a status of affected subconditions.

\* \* \* \* \*

UNITED STATES PATENT AND TRADEMARK OFFICE
CERTIFICATE OF CORRECTION

PATENT NO. : 11,294,905 B2
APPLICATION NO. : 16/724927
DATED : April 5, 2022
INVENTOR(S) : David R. Cheriton Page 1 of 1

It is certified that error appears in the above-identified patent and that said Letters Patent is hereby corrected as shown below:

In the Claims

In Column 20, Line(s) 38, Claim 1, delete "statues" and insert --statuses--, therefor.

In Column 21, Line(s) 38, Claim 7, after "subcondition" delete "statues" and insert --statuses--, therefor.

In Column 22, Line(s) 33, Claim 10, after "subcondition" delete "statues" and insert --statuses--, therefor.

Signed and Sealed this
Second Day of August, 2022

*Katherine Kelly Vidal*

Katherine Kelly Vidal
*Director of the United States Patent and Trademark Office*